United States Patent [19]

Murphy et al.

[11] Patent Number: 4,622,904
[45] Date of Patent: Nov. 18, 1986

[54] COMBINED FLUIDIZED BED CALCINER AND PULVERIZED COAL BOILER AND METHOD OF OPERATION

[75] Inventors: Melvin E. Murphy, Jakarta, Indonesia; Wadie F. Gohara, Barberton, Ohio

[73] Assignee: The Babcock & Wilcox Company, New Orleans, La.

[21] Appl. No.: 809,086

[22] Filed: Dec. 13, 1985

[51] Int. Cl.$^4$ .............................................. F23D 1/00
[52] U.S. Cl. .................................... 110/263; 110/245; 122/4 D
[58] Field of Search ............... 110/234, 245, 263, 347; 122/4 D; 431/7, 170; 432/15, 58

[56] References Cited

U.S. PATENT DOCUMENTS

| | | | |
|---|---|---|---|
| 3,009,513 | 11/1961 | Houdry .............................. | 122/4 D |
| 3,814,176 | 6/1974 | Seth ................................. | 122/4 D X |
| 4,250,839 | 2/1981 | Daman .............................. | 122/4 D |
| 4,303,023 | 12/1981 | Perkins et al. ................... | 110/245 X |
| 4,343,246 | 8/1982 | Jukkola et al. .................... | 110/222 |
| 4,427,053 | 1/1984 | Klaren .............................. | 122/4 D X |
| 4,476,816 | 10/1984 | Cannon et al. ..................... | 122/4 D |

Primary Examiner—Albert J. Makay
Assistant Examiner—Steven E. Warner
Attorney, Agent, or Firm—Robert J. Edwards; Michael L. Hoelter

[57] ABSTRACT

A fluidized bed calciner cooperating with a pulverized coal boiler includes a two tier fluidized lime cooling bed arrangement. Control of the combustion air flow through the fluidized bed calciner by means of a bypass achieves flexible operation and economy. The cooling beds transfer heat from the hot lime to the combustion air, and a bypass controls the temperature of the air flowing to the combustion chamber. The two tier arrangement is compact and adaptable to the retrofitting of a standardized pulverized coal boiler.

6 Claims, 1 Drawing Figure

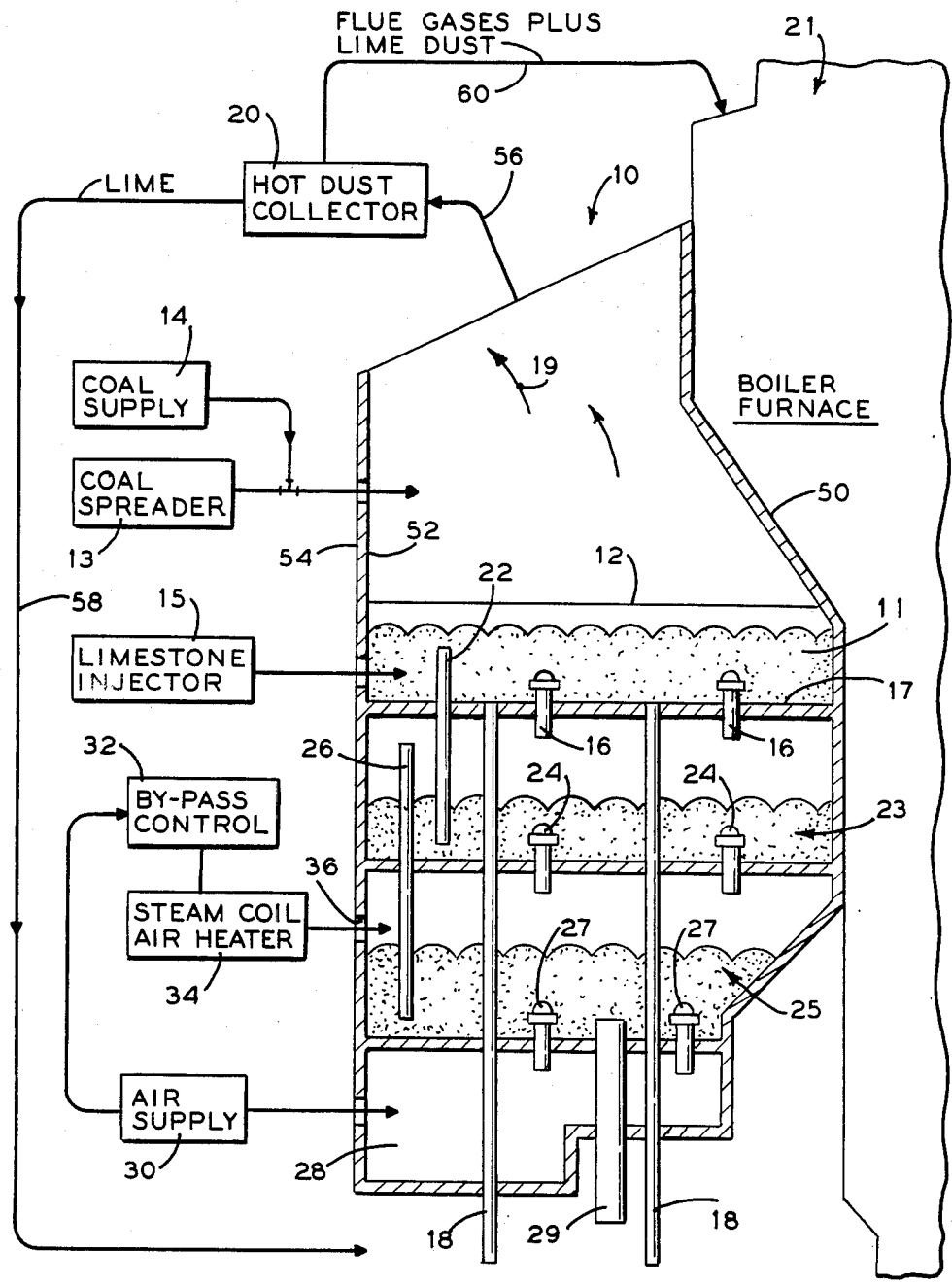

COMBINED FLUIDIZED BED CALCINER AND PULVERIZED COAL BOILER AND METHOD OF OPERATION

FIELD OF THE INVENTION

The present invention relates to fluidized bed combustion and more particularly, to a combined fluidized bed calciner and pulverized coal boiler apparatus.

BACKGROUND OF THE INVENTION

The use of fluidized beds has long been known as a way of improving the performance of a combustor. Where fuel is combusted in a mass of particulates forming the bed material, it is not uncommon to introduce limestone or dolomite as bed materials to combine or react with the sulfur dioxide released by the combustion reaction. The reaction in the combustion chamber is known to generate as by-products: lime, sulfur dioxide, various combustion gases, ash, and heat. In order to maximize the efficiency and cost effectiveness of such combustion, it is advantageous to recoup from these combustion by-products as much of the usable material as practical. Of primary importance is the recoupment of heat and lime dust from the flue gas and excess lime from the fluidized bed combustion chamber.

It has been suggested that an additional fluidized bed may serve the dual purpose of collecting excess lime from an adjacent fluidized bed combustion chamber as well as acting as a heat exchange device capturing heat from recirculated flue gas. This type of auxiliary bed is disclosed in U.S. Pat. No. 4,303,023 to Perkins et al. and also shown in U.S. Pat. No. 4,343,246 to Jukkola et al. While these devices do serve the purpose of capturing heat and lime dust they suffer two principal limitations.

The first limitation is the difficulty in operating these types of combustors at reduced levels. Operating at a reduced level is important where it is desirable to reduce the overall reaction rate or where it is desirable to operate the combustor as a calciner only, thereby reducing the contamination of the lime product. The second limitation is the inability of these prior art devices to be adapted to existing conventional pulverized coal boilers.

It can therefore be appreciated by one skilled in the art that a fluidized bed coal combustion device, which has significant calcining capability and which is adaptable to existing conventional coal boilers, would be useful, desirable, and profitable.

It is an object of this invention to provide a coal combustion device which is capable of operating as a calciner during reduced levels of operation. It is a further object of this invention to provide a device which is capable of producing high purity soft burned lime. It is yet a further object of the invention to provide a means for retrofitting conventional coal boilers to obtain the teachings and advantages of the present invention. It is another object of the invention to improve the means by which excess lime generated by a fluidized bed coal combustor is collected and cooled for eventual sale or reuse. It is yet another object of the invention to provide a method whereby a plurality of conventional boilers may be supplied with high quality lime generated by an apparatus incorporating the teachings of the present invention to reduce sulfur dioxide emissions, i.e. provide the conventional boiler with it's own source for lime injection while recouping the heat.

SUMMARY OF THE INVENTION

Accordingly, these and other objects are met by providing a combined fluidized bed calciner and pulverized coal boiler. Two separate fluidized beds are provided for collecting and cooling excess lime generated by the adjacent fluidized bed combustion chamber. These fluidized lime cooling beds serve as pre-heating chambers for combustion air which is introduced from an external source. A bypass is provided which enables the elimination of one fluidized lime cooling bed from the pre-heating process. In addition, the teachings of the present invention may be used to modify a standard or conventional coal boiler to yield the substantial benefits inherent in this disclosure. In accordance with the teachings of the present invention, a fluidized bed reactor is provided with a first fluidized lime cooler bed adjacent to the combustion chamber. Excess lime from the combustion chamber is accumulated in the first lime cooler bed. A second fluidized lime cooler bed is provided adjacent the first lime cooler bed with excess lime from the first lime cooler bed accumulating in the second lime cooler bed. A portion of the combustion air is circulated either through the first lime cooler bed and into the combustion chamber; or into a windbox, through the first and second lime cooler beds, and then into the combustion chamber. The two tier lime cooling beds preheat this combustion air. Cooled lime from the second lime cooler bed is then collected for subsequent use adjacent the fluidized bed reactor.

BRIEF DESCRIPTION OF THE DRAWING

The sole drawing is a schematic cross-sectional view of the combined fluidized bed calciner and pulverized coal boiler of the present invention showing the two tier fluidized lime cooling beds in a vertically stacked arrangement.

DESCRIPTION OF THE PREFERRED EMBODIMENT

With reference to the drawing, fluidized bed calciner and pulverized coal boiler 10 of the present invention includes combustion chamber 11. Combustion chamber 11 is generally located adjacent the front wall of the boiler under boiler furnace front hopper slope 50.

This combustion chamber 11 is constructed from membrane wall panels 52 which are part of the boiler steam producing water circuitry and thus provide a water cooled enclosure for combustion chamber 11.

Coal is introduced into combustion chamber 11 above refractory line 12 by coal overfeed spreader 13 which is fed from a coal supply 14 and limestone is introduced into combustion chamber 11 by limestone injector 15. Both coal spreader 13 and limestone injector 15 inject their respective material into combustion chamber 11 through ports located in front wall 54 of fluidized bed calciner 10. The limestone is fed into combustion chamber 11 below the top of the lime, limestone and coal mixture.

A fluidized bed effect is maintained by introducing combustion air into combustion chamber 11 through a plurality of bubble caps 16. Bubble caps 16 extend through water cooled panel floor 17 of combustion chamber 11 and panel floor 17 also comprises a portion of the boiler steam producing water circuitry.

During combustion, the heat generated by the coal calcines the limestone to lime driving off $CO_2$. Ash elutriates from the bed into the gas stream. Fuel impurities and limestone are relatively more dense than lime and thus tend to stay near the bottom of combustion chamber 11 where it can enter drain 18 in panel floor 17 and is ultimately disposed of. The gases from combustion chamber 11, indicated by arrows 19, and some elutriated lime dust passes through refractory lined flue 56 to hot dust collector 20. Hot dust collector 20 captures a portion of this elutriated lime dust and transports it via passage way 58 to storage. The balance of the lime dust carried by gases 19 enters boiler furnace 21 via flue 60 and captures sulfur that is in the boiler's pulverized coal fired flue gases. The heat available in these gases is recovered by the boiler heat transfer surface in the furnace and in the convection pass of boiler 21.

The majority of the less dense granular lime, however, remains in combustion chamber 11 and is drained by means of a product lime drain 22 into first fluidized lime cooler bed 23 located directly below combustion chamber 11. Generally, the top of product lime drain 22 is positioned approximately 4 feet above panel floor 17 thus the depth of the coal, lime, and limestone mixture in combustion chamber 11 is approximately 4 feet and it is the less dense lime, floating to the top, that is drained by lime drain 22. High purity granulated lime is drained into first fluidized lime cooler bed 23 since the heavier ash and limestone from combustion chamber 11 remain adjacent to panel floor 17 and are drained by drain 18.

The fluidized or tumbling effect is maintained in first cooler bed 23 by introducing air into it through bubble caps 24. The first fluidized lime cooler bed 23 acts as a manifold for bubble caps 16 of combustion chamber 11. This bed is used to transfer heat from the hot lime dust to the air traveling through it toward combustion chamber 11. The height of first cooler bed 23 is regulated by product lime drain 26 that drains the cooled lime from first fluidized lime cooler bed 23 to second fluidized lime cooler bed 25 located underneath first bed 23.

Lime enters second bed 25 via product lime drain 26 which extends down from first bed 23 into second bed 25. Second bed 25 is also fluidized by admitting air through bubble caps 27 from windbox 28 which acts as a manifold for bubble caps 27 thereabove. Similarly, second fluidized lime cooler bed 25 acts as a manifold for bubble caps 24 thereabove and heat is transferred to the air moving through second bed 25 from the heated lime drained into it from bed lime drain 29 which discharges the now cooled lime outside combined calciner boiler 10. Cooled lime is extracted from second bed 25 by lime drain 29 which discharges the now cooled lime outside combined calciner boiler 10. The enclosure for the two cooling beds may be water cooled, but is generally constructed of insulated steel plates.

Air supply 30 is coupled to windbox 28 and supplies combustion air to it which is subsequently pre-heated by first and second lime cooler beds 23 and 25 respectively. Bypass control 32, coupled to air supply 30, enables a portion of the combustion air traveling toward combustion chamber 11 to bypass second lime cooler bed 25. A steam coil air heater 34 is connected downstream of bypass 32 for the purpose of heating this bypass air should such heating be required. Bypass control 32 is used to control the temperature of the air traveling to combustion chamber 11.

In operation, air from air supply 30 enters either windbox 28 and/or bypass control 32 depending upon the desired temperature of this air. Air entering windbox 28 flows through both the second fluidized lime cooler bed 25 and first fluidized lime cooler bed 23 where it is preheated prior to flowing into combustion chamber 11. Alternately, bypass control 32 directs air from air supply 30 into steam coil air heater 34 for heating if needed and through first fluidized lime cooler bed 23, via bubble caps 24, as indicated by arrow 36, and then to combustion chamber 11.

As will be appreciated by those skilled in the art, the bypass option allows the parameters which affect the reaction rate to be varied, thereby introducing a degree of operational flexibility into this device unavailable in the prior art. In addition, the stacked two tier arrangement permits the location of a combination calciner-boiler in a compact or otherwise restrictive location.

Obviously, many modifications may be made without departing from the basic spirit of the present invention. Accordingly, within the scope of the appended claims, the invention may be practiced other than specifically disclosed herein.

What is claimed is:

1. A fluidized bed calciner operating with a coal fired boiler comprising:
    a fluidized bed combustion chamber wherein coal is burned and hot flue gases and lime are produced;
    a first fluidized lime cooler bed adjacent said combustion chamber including means for receiving lime produced in said combustion chamber and means for supplying air to fluidize said fluidized bed combustion chamber;
    a second fluidized lime cooler bed adjacent said first fluidized lime cooler bed including means for receiving lime from said first fluidized lime cooler bed and means for supplying air to fluidize said first fluidized lime cooler bed;
    a windbox adjacent said second fluidized lime cooler bed for supplying air to fluidize said second fluidized lime cooler bed;
    air suply means for supplying air to said windbox;
    bypass means for selectively circulating a portion of said air from said air supply means to fluidize said first fluidized lime cooler bed, said bypass means having steam coil heating means for selectively heating said air supplied to said first fluidized lime cooler bed;
    first-removal means for removing lime from said second fluidized lime cooler bed; and,
    second removal means for separately removing combustion by-products from said fluidized bed combustion chamber.

2. A fluidized bed calciner as set forth in claim 1 wherein said windbox, said first and second fluidized lime cooler beds, and said combustion chamber all lay in a vertically stacked arrangement relative to each other.

3. A fluidized bed calciner operating with a coal fired boiler comprising:
    a fluidized bed combustion chamber wherein coal is burned and hot flue gases and lime are produced;
    a first fluidized lime cooler bed adjacent said combustion chamber including means for receiving lime produced in said combustion chamber and means for supplying air to fluidize said fluidized bed combustion chamber;
    a second fluidized lime cooler bed adjacent said first fluidized lime cooler bed including means for receiving lime from said first fluidized lime cooler bed and means for supplying air to fluidize said first fluidized lime cooler bed;
    a windbox adjacent said second fluidized lime cooler bed for supplying air to fluidize said second fluidized lime cooler bed, said windbox, said first and second fluidized lime cooler beds, and said combustion chamber all lying in a vertically stacked arrangement relative to each other;

air supply means for supplying air to said windbox;

bypass means for selectively circulating a portion of said air from said air supply means to fluidize said first fluidized lime cooler bed, said bypass means having heating means comprising a steam coil air heater for heating said air supplied to said first fluidized lime cooler bed;

first removal means for removing lime from said second fluidized lime cooler bed; and, second removal means for removing combustion by-products from said fluidized bed combustion chamber.

4. A fluidized bed calciner as set forth in claim 3 further comprising:

first bubble caps in said first lime cooler bed;

second bubble caps in said second fluidized lime cooler bed; and, third bubble caps in said fluidized bed combustion chamber wherein said second fluidized lime cooler bed acts as a manifold for said first fluidized lime cooler bed, and said first fluidized lime cooler bed acts as a manifold for said fluidized bed combustion chamber.

5. A fluidized bed calciner as set forth in claim 4 further comprising:

a first lime drain for draining lime from said fluidized bed combustion chamber to said first fluidized lime cooler bed;

a second lime drain for draining lime from said first fluidized lime cooler bed to said second fluidized lime cooler bed;

a third lime drain for draining lime from said second fluidized lime cooler bed; and, a combustion by-products drain for draining combustion by-products from said fluidized bed combustion chamber.

6. A fluidized bed calciner as set forth in claim 5 further comprising a hot dust collector for collecting lime dust in said flue gases from said fluidized bed combustion chamber and directing said collected lime dust to storage and directing said flue gases and uncollected lime dust to said boiler.

* * * * *